S. C. Coffin,
Sawing Shingles.
N° 24,283. Patented June 7, 1859.
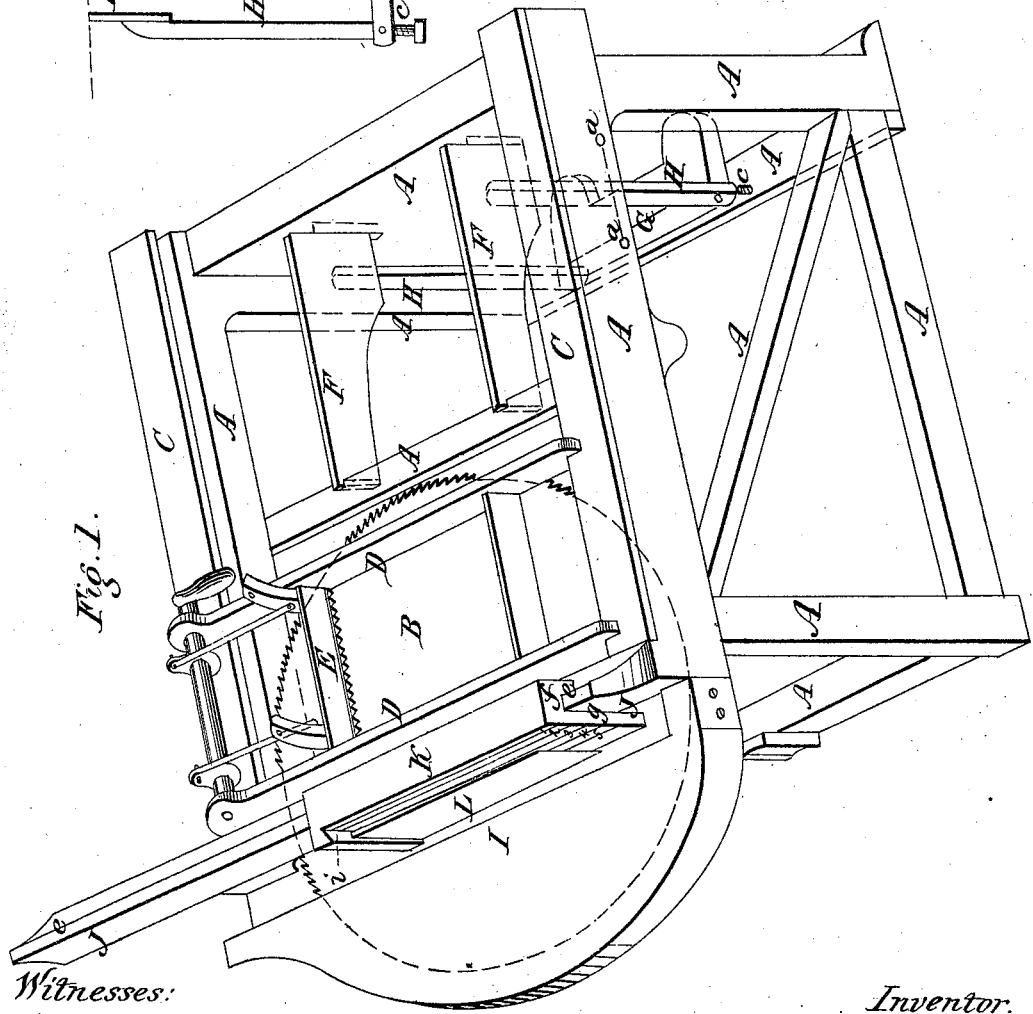
Witnesses:
A. B. Stoughton
Thos. H. Upperman
Inventor.
S. C. Coffin

UNITED STATES PATENT OFFICE.

S. C. COFFIN, OF LAWRENCEVILLE, PENNSYLVANIA.

METHOD OF JOINTING SHINGLES.

Specification of Letters Patent No. 24,283, dated June 7, 1859.

*To all whom it may concern:*

Be it known that I, S. C. COFFIN, of Lawrenceville, in the county of Allegheny and State of Pennsylvania, have invented a new and useful Improvement in Shingle-Machines; and I do hereby declare the following to be a full, clear, and exact description of the construction and operation of the same, reference being had to the accompanying drawings, making a part of this specification, in which—

Figure 1, represents in perspective the entire machine. Fig. 2, represents a detached portion thereof.

Similar letters where they occur in the separate figures, denote like parts of the machine in both of them.

My invention consists in the application, to shingle machines wherein a horizontal saw is used, of a separate transverse carriage on which the sawed shingle is traversed past the saw for the purpose of jointing it, as will be explained.

To enable others skilled in the art to make and use my invention, I will proceed to describe the same with reference to the drawings.

A represents a frame upon one end of which a horizontal saw B, is mounted, so as to freely turn upon its vertical shaft. On top of the frame are ways C, C, upon which a carriage D, is placed, that has a dog E, or dogs upon it for dogging the bolt from which the shingles are to be cut, and for carrying said bolt past the edge of the saw sufficiently far to cut the shingle from the bolt.

F, F, are two supporting pieces for catching the bolt when it is undogged from the carriage over or above them, and for giving said bolt the proper inclination for taking the shingle from it, "butt and point"—that is, for taking the butts or points from alternate ends of the bolts, so as to keep the bolt as nearly horizontal as possible. These pieces F, move vertically in slots, grooves or guides; they are connected to a treadle G, by rods or stirrups H H. The treadle G, is hinged or pivoted at its center $a$, so that the operator may by his foot or hand rock said treadle, and thus change the positions of the pieces F, F, and consequently of the bolt upon them. Set screws $c$, $c$, are so arranged in connection with the treadle, as that said treadle can only vibrate until it reaches the set screw, and thus the thickness and taper of the shingle may be adjusted to a nicety.

The after portion of the saw, is covered by a shield I, that forms a table; and in front of this table there is a cross piece J, extending from side to side of the main frame, and at one end beyond the main frame far enough to allow a carriage K, that travels upon it, to move clear of the saw. A way $e$ is formed on this cross piece J, upon which the portion $f$, of the carriage K snugly fits, and over which it must freely move. The vertical portion $g$, of the carriage K, may be divided into horizontal lines 1, 2, 3, 4, 5, for jointing the shingles perfectly with parallel edges, by a gage, and of such assorted widths as an economical use or saving of the timber, will admit of.

On the end of the carriage K, there is a stop $i$, against which the end of the shingle (L) is supported as it runs or travels past the saw to be jointed. By this simple arrangement, and at a very moderate expense, the same saw that cuts the shingles from the bolt, is used for jointing the shingles after they are cut—and two or more shingles may be jointed at the same time.

The machinery for sawing the shingle from the bolt, constitutes no part of this invention which consists in the application of the jointing devices, so as to cause one saw to do both the severing of the shingle from the bolt, and jointing their edges also. The operation of adjusting the bolt, and sawing the shingle from it, is obvious and needs no further description. The jointing is done as follows: The carriage K, is run out onto the projecting end of the piece J. One, two, or more shingles are placed against the stop $i$, their lower edges projecting far enough below the plane of the saw to insure a good joint upon them. In this position the operator simply pressing the shingles against the vertical part of the carriage, runs them with the carriage past, or over the saw, to remove the excess of wood on their lower edges. This done the carriage is run back again, and the shingle or shingles turned with the jointed edges upward, and adjusted to such one of the lines 1, 2, 3, &c., as will allow the other edges to be jointed, which will be perfectly parallel with the first jointed edge—the lines 1, 2, 3 &c being parallel to the plane of the saw. It will be seen further that the jointing of the shingles in nowise interferes with the sawing. Both can go on at the same time. Nor need there be any additional power applied to the saw, for the jointing can take place while the bolt is being run back to be changed, and the running back of the shingle on its carriage can take place while the saw is cutting another shingle from the bolt. But the power expended in jointing shingles is so immaterial as not to retard the saw to any extent.

Having thus fully described the nature and object of my invention, what I claim therein as new and desire to secure by Letters Patent is—

So combining with the horizontal saw B, that saws the shingle from the bolt, the transverse piece J, and carriage K, upon it, so that the same saw that cuts the shingles from the bolt, may be used for jointing said shingles, as herein set forth and explained.

S. C. COFFIN.

Witnesses:
A. B. STOUGHTON,
THOS. HUPPERMAN.